United States Patent
Gibson et al.

(10) Patent No.: US 9,481,360 B1
(45) Date of Patent: Nov. 1, 2016

(54) VEHICLE DRIVELINE DAMPER OSCILLATION CONTROL

(71) Applicant: Ford Global Technologies, LLC, Dearborn, MI (US)

(72) Inventors: Alexander O'Connor Gibson, Ann Arbor, MI (US); Steven Anatole Frait, Milan, MI (US); Felix Nedorezov, Rochester Hills, MI (US); Walter Joseph Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/727,258

(22) Filed: Jun. 1, 2015

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 20/00* | (2016.01) |
| *B60W 30/18* | (2012.01) |
| *B60W 30/20* | (2006.01) |
| *B60W 10/02* | (2006.01) |
| *B60W 10/06* | (2006.01) |
| *B60W 10/08* | (2006.01) |
| *B60W 10/184* | (2012.01) |

(52) U.S. Cl.
CPC ............ *B60W 20/108* (2013.01); *B60W 10/02* (2013.01); *B60W 10/026* (2013.01); *B60W 10/06* (2013.01); *B60W 10/08* (2013.01); *B60W 10/184* (2013.01); *B60W 20/1062* (2013.01); *B60W 20/40* (2013.01); *B60W 30/18127* (2013.01); *B60W 30/20* (2013.01); *B60W 2510/0241* (2013.01); *B60W 2710/021* (2013.01); *B60W 2710/06* (2013.01); *B60W 2710/083* (2013.01); *Y10S 903/93* (2013.01)

(58) Field of Classification Search
CPC ............ B60W 20/108; B60W 10/02; B60W 10/026; B60W 10/06; B60W 10/08; B60W 10/184; B60W 20/1062; B60W 20/40; B60W 30/18127; B60W 30/20; B60W 2510/0241; B60W 2710/021; B60W 2710/06; B60W 2710/083; Y10S 903/93
USPC .......................................................... 701/22
See application file for complete search history.

(56) References Cited

U.S. PATENT DOCUMENTS

| | | | |
|---|---|---|---|
| 8,758,200 B2 | 6/2014 | Dai et al. | |
| 8,882,636 B2 * | 11/2014 | Pietron | B60W 10/02 477/176 |
| 9,031,722 B2 * | 5/2015 | Doering | B60W 20/10 701/22 |
| 9,333,974 B1 * | 5/2016 | Gibson | B60W 30/192 |
| 9,371,066 B2 * | 6/2016 | Pietron | B60W 30/18 |
| 2009/0124453 A1 * | 5/2009 | Seel | B60K 6/48 477/5 |
| 2012/0273313 A1 * | 11/2012 | Sasse | F16F 15/1343 188/380 |
| 2013/0138283 A1 | 5/2013 | Cho | |
| 2013/0274969 A1 * | 10/2013 | Wang | B60W 10/08 701/22 |
| 2013/0297109 A1 * | 11/2013 | Nefcy | B60W 20/00 701/22 |
| 2013/0297161 A1 | 11/2013 | Gibson et al. | |

* cited by examiner

*Primary Examiner* — Fadey Jabr
*Assistant Examiner* — Paula L Schneider
(74) *Attorney, Agent, or Firm* — David B. Kelley; Brooks Kushman P.C.

(57) ABSTRACT

A vehicle includes an electric machine, a torque converter and damper, and a controller. The controller is programmed to operate the electric machine to apply a regenerative torque according to a deflection of the damper and a difference between a speed of the electric machine and an output speed of the torque converter.

20 Claims, 2 Drawing Sheets

VEHICLE DRIVELINE DAMPER OSCILLATION CONTROL

TECHNICAL FIELD

This disclosure relates to the control of automotive driveline components to reduce damper oscillation.

BACKGROUND

A vehicle may include an engine and electric machine for propulsion. The electric machine may be selectively coupled to the engine via a clutch. The electric machine may be used to satisfy low torque demands, and the engine (or engine and electric machine) may be used to satisfy high torque demands.

SUMMARY

A vehicle includes an electric machine, a torque converter including a damper, and a controller. The controller operates the electric machine to apply a regenerative torque based on a parameter indicative of a deflection of the damper and a parameter indicative of a difference between a rotor speed of the electric machine and an output speed of the torque converter.

A method of controlling a vehicle driveline includes commanding, by a controller, an electric machine to apply a regenerative torque based on a parameter indicative of driveline damper deflection and a parameter indicative of a difference between a speed of the electric machine and an output speed associated with the driveline damper deflection.

A vehicle driveline system includes an electric machine, a damper, and a controller. The controller, while operating the electric machine to apply a regenerative torque, introduces feedback to a calculated torque of the electric machine to reduce amplitude of oscillation of the damper. The feedback is proportional to a difference between a speed of the electric machine and an output speed associated with the damper.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments.

As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
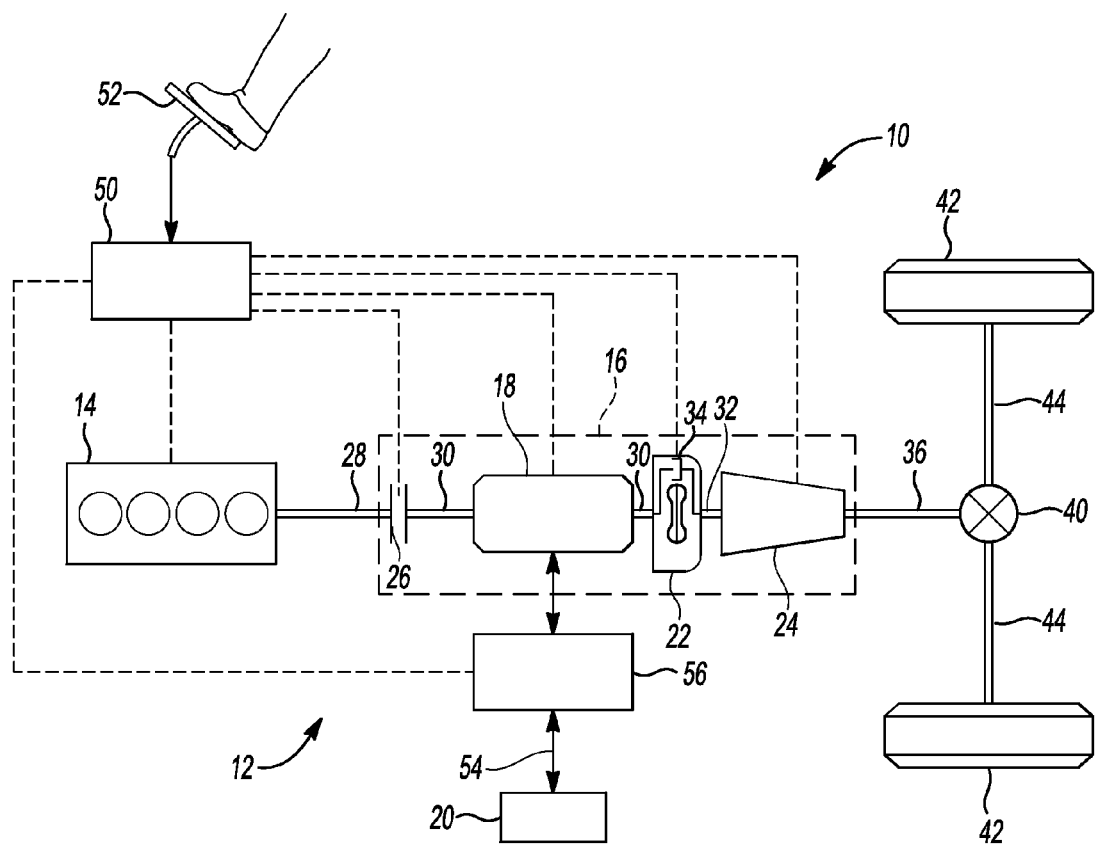
FIG. 1 is a schematic diagram of a vehicle.

FIG. 1 is a schematic diagram of a hybrid electric vehicle (HEV) 10 illustrating representative relationships among components. Physical placement and orientation of the components within the vehicle, however, may vary. The HEV 10 includes a powertrain 12. And, the powertrain 12 includes an engine 14 that drives a transmission 16. As will be described in further detail below, transmission 16 includes an electric machine such as an integrated starter-generator (ISG) 18, an associated traction battery 20, a torque converter 22, and a multiple step-ratio automatic transmission or gearbox 24.

The engine 14 and ISG 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the ISG 18 when a disconnect clutch 26 between the engine 14 and the ISG 18 is at least partially engaged. The ISG 18 may be implemented by any one of a plurality of types of electric machines. For example, the ISG 18 may be a permanent magnet synchronous motor. Power electronics condition direct current (DC) power provided by the battery 20 for the ISG 18, as will be described below. The power electronics, for example, may provide three phase alternating current (AC) to the ISG 18.

When the disconnect clutch 26 is at least partially engaged, power flow from the engine 14 to the ISG 18 or from the ISG 18 to the engine 14 is possible. For example, the disconnect clutch 26 may be engaged and the ISG 18 may operate as a generator to convert rotational energy provided by a crankshaft 28 and ISG shaft 30 into electrical energy to be stored in the battery 20. The disconnect clutch 26 can also be disengaged to isolate the engine 14 from the remainder of the powertrain 12 such that the ISG 18 can act as the sole drive source for the HEV 10. The shaft 30 extends through the ISG 18. The ISG 18 is continuously drivably connected to the shaft 30, whereas the engine 14 is drivably connected to the shaft 30 only when the disconnect clutch 26 is at least partially engaged.

The schematic illustrated in FIG. 1 is merely exemplary and is not intended to be limiting. Other configurations are contemplated that utilize selective engagement of both an engine and a motor to transmit torque through a transmission. For example, the ISG 18 may be offset from the crankshaft 28, an additional motor may be provided to start the engine 14, and/or the ISG 18 may be provided between the torque converter 22 and gearbox 24.

The ISG 18 is also connected to the torque converter 22 via the shaft 30. The torque converter 22 is therefore connected to the engine 14 when the disconnect clutch 26 is at least partially engaged. The torque converter 22 includes an impeller fixed to the shaft 30 and a turbine fixed to a transmission input shaft 32. It thus provides a hydraulic coupling between the shaft 30 and transmission input shaft 32, and transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque.

A torque converter bypass clutch 34 may, when engaged, frictionally or mechanically couple the impeller and turbine of the torque converter 22, permitting more efficient power transfer. The torque converter bypass clutch 34 may be operated as a launch clutch to provide smooth vehicle launch. Alternatively, or in combination, a launch clutch similar to the disconnect clutch 26 may be provided between the ISG 18 and gearbox 24 for applications that do not include a torque converter 22 or a torque converter bypass clutch 34. In some applications, the disconnect clutch 26 is generally referred to as an upstream clutch, and the launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to the output shaft 36.

The torque converter 22 and hydraulically controlled gearbox 24 is, of course, one example of a gearbox or transmission arrangement; any multiple ratio gearbox that accepts input torque(s) from an engine and/or motor, and then provides torque to an output shaft at the different ratios is acceptable for use with embodiments of the present disclosure. For example, the gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements.

The output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). As such, the powertrain control unit 50 and one or more other controllers can collectively be referred to as a "controller" that controls various actuators in response to signals from various sensors to control functions such as starting/stopping engine 14, operating the ISG 18 to provide wheel torque or charge the battery 20, select or schedule transmission shifts, etc.

The controller may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM). Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine 14 or vehicle 10. Additionally, the controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

The controller 50 may communicate signals to and/or from the engine 14, ISG 18, disconnect clutch 26, launch clutch 34, transmission gearbox 24, and power electronics 56. Although not explicitly illustrated, those of ordinary skill will recognize various functions or components that may be controlled by the controller 50 within each of the subsystems identified above. Representative examples of functions, parameters, systems, and/or components that may be directly or indirectly actuated using control logic executed by the controller 50 include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, ISG operation, clutch pressures for the disconnect clutch 26, launch clutch 34, and transmission gearbox 24, etc.

Control logic or functions performed by the controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill will recognize that one or more of the illustrated steps or functions may be repeatedly performed depending upon the particular processing strategy being used. Similarly, the order of processing is not necessarily required to achieve the features and advantages described herein, but is provided for ease of illustration and description.

The control logic may be implemented primarily in software executed by a microprocessor-based vehicle, engine, and/or powertrain controller, such as the controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle 10 or its subsystems. The computer-readable storage devices or media may include one or more of a number of known physical devices which utilize electric, magnetic, and/or optical storage to keep executable instructions and associated calibration information, operating variables, etc.

An accelerator pedal 52 is used by the driver of the vehicle to provide a demanded torque, power, or drive command to propel the vehicle 10. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the ISG 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle 10 with the engine 14, the disconnect clutch 26 is at least partially engaged to transfer at least a portion of the engine torque through the disconnect clutch 26 to the ISG 18, and then from the ISG 18 through the torque converter 22 and gearbox 24. When the engine 14 alone provides the torque necessary to propel the vehicle, this operation mode may be referred to as the "engine mode," "engine-only mode," or "mechanical mode." The ISG 18 may assist the engine 14 by providing additional power to turn the shaft 30. This operation mode may be referred to as a "hybrid mode," an "engine-motor mode," or an "electric-assist mode."

To drive the vehicle with the ISG 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the ISG 18. The controller 50 commands the power electronics 56 to convert voltage from the battery 20 to an AC voltage provided to the ISG 18 to provide positive or negative torque to the shaft 30. This operation mode may be referred to as an "electric only mode," "EV (electric vehicle) mode," or "motor mode."

In any mode of operation, the ISG 18 may act as a motor and provide a driving force for the powertrain 12. Alternatively, the ISG 18 may act as a generator and convert kinetic energy from the powertrain 12 into electric energy to be stored in the battery 20. The ISG 18 may act as a generator while the engine 14 is providing propulsion power for the vehicle 10. The ISG 18 may additionally act as a generator during times of regenerative braking in which rotational energy from spinning wheels 42 is transferred back through the gearbox 24 and is converted into electrical energy for storage in the battery 20.

In electric only regenerative mode, the bypass clutch 34 must be locked to minimize the potential for the ISG rotor to spin in the reverse direction. This is particularly important as the transmission hydraulic pump is driven by a shaft (not shown) that is mechanically connected between the ISG rotor, or torque converter impeller, and the transmission hydraulic pump. If the ISG rotor spins in the negative direction, or if the speed drops below a minimum threshold, the transmission pump flow will drop to zero and the hydraulic pressure within the transmission 24 will also drop to zero, which may be undesirable.

Figure 2:
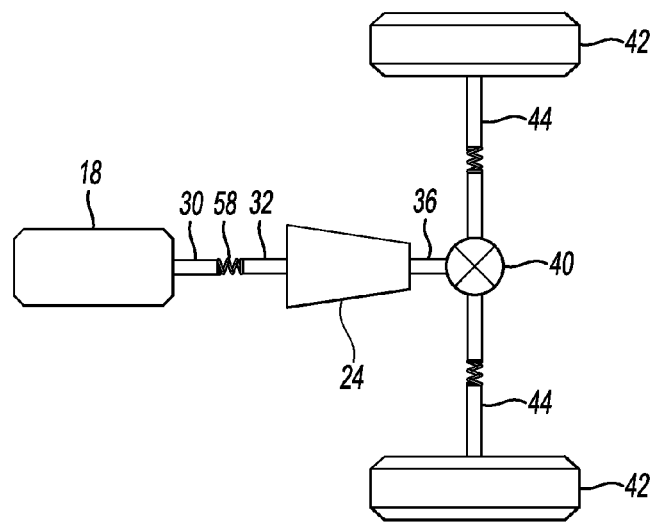
FIG. 2 is an equivalent representation of the vehicle of FIG. 1 in electric drive or regenerative mode with the disconnect clutch open and bypass clutch locked, and the torque converter damper rotary spring shown.

When the disconnect clutch 26 is open and the bypass clutch 34 is locked, the driveline dynamics can be represented by the schematic diagram of FIG. 2. A damper 58 (a rotary spring) of the torque converter 22 only affects the driveline dynamics when the bypass clutch 34 is fully locked: the damper 58 adds compliance between the ISG rotor and the transmission input shaft 32. Due to the large inertia of the ISG rotor, the damper absorbs sudden torque transients that originate at the wheels 42 when the vehicle 10 is operating on a rough road. (Although the bypass clutch 34 could be made to slip to provide compliance between the ISG rotor and transmission input shaft 32, such slipping may reduce driveline efficiency.)

The damper 58 is constructed, for example, by mounting two or four springs between two stamped steel plates. Automatic transmission dampers of the kind typically mounted in bypass clutches have two springs that are mounted in arc shaped slots with a total deflection of 60 to 120 degrees. (Manual transmission dampers typically have four short linear springs that have a total travel of roughly 20 degrees.)

When operating in electric or regenerative mode with the disconnect clutch 26 open and the bypass clutch 34 locked, the total torque across the damper 58 is the sum of the torque from the ISG 18 and the wheel torque transmitted through the driveline. When operating in regenerative mode with the vehicle 10 coasting down a significant negative grade, the total torque across the damper 58 may significantly compress the damper springs. Under these conditions, if the vehicle 10 travels over a rough road section, the additional driveline torque may cause the damper 58 to fully compress and "bang" on the maximum travel end-stops (not shown). Such behavior can fatigue the damper springs and affect noise, vibration and harshness (NVH). Additionally, if the driver applies or pumps the brakes, the sudden increase in ISG regenerative braking torque may further excite oscillation or resonance of the damper 58 as it bounces off the end of spring travel. Therefore, techniques to minimize the potential for the damper 58 to reach the end of travel during regenerative operation on rough roads may be desirable.

Figure 3:
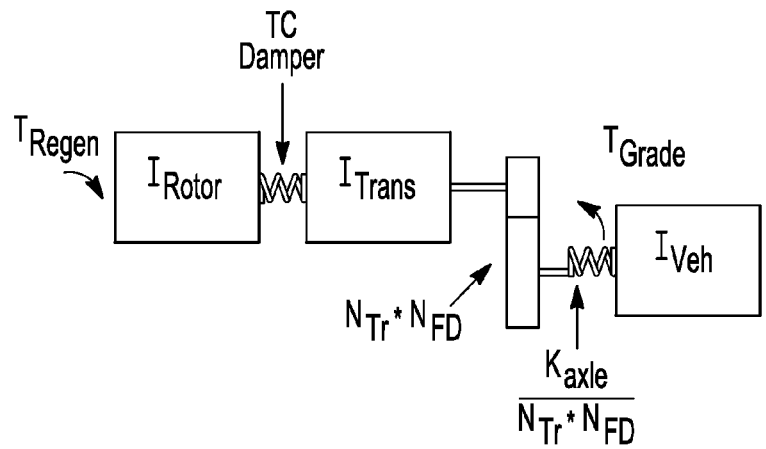
FIG. 3 is another equivalent representation of the vehicle of FIG. 1 in regenerative mode with the disconnect clutch open and bypass clutch locked, and the fixed gear rotational dynamics shown.

During regenerative operation in a fixed gear, i.e., between shift events, with the bypass clutch 34 locked, the rotational dynamics of the ISG rotor inertia, $I_{rotor}$, damper, transmission inertia, $I_{Trans}$, and axle stiffness, $K_{axle}$, can be represented as shown in FIG. 3. Here, the vehicle inertia, $I_{Veh}$, is assumed to high enough relative to the rotor and transmission inertias such that the vehicle inertia rotational speed can be treated as a constant when assessing resonance modes.

In a fixed gear, the regenerative rotational dynamics has three resonance modes. The lowest frequency mode is typically the resonance of the rotor and transmission inertia rotating together on the effective axle stiffness which is inversely proportional to a product of the selected gear ratio, $N_{Tr}$, e.g. $1^{st}$ through $6^{th}$ or $1^{st}$ through $10^{th}$, and the final drive ratio, $N_{FD}$. The next higher frequency mode is the rotor inertia rotating on the damper stiffness. And, the third frequency mode is the transmission inertia rotating between these two stiffnesses.

When the vehicle 10 is traveling at constant speed (e.g., grade torque, $T_{grade}$, is equal to the regenerative torque, $T_{regen}$, plus road load torque at the wheel) along a road with a negative (downhill) grade, neglecting the road load and frictional losses, the torque across the damper 58, $T_{damper}$, is equal to $$T_{damper} = T_{regen} + T_{grade} \qquad \text{Eq. 1}$$

And, the damper deflection is equal to $$\theta_{damper} = \frac{T_{damper}}{K_{damper}} \qquad \text{Eq. 2}$$

where $K_{damper}$ is the damper stiffness. Under this downhill regenerative condition, the damper springs will potentially be fully compressed or close to the fully compressed state where the level of damper spring compression is a function of the regenerative and grade torques and the damper stiffness. See, Eqs. 1 and 2. If under these conditions the driven wheel(s) roll over a section of rough road or the operator presses or pumps the brakes, the excitation of the driveline resonance modes may cause the damper springs to load and unload against the fully compressed spring state. It has been shown through testing that this behavior can affect spring performance and degrade NVH.

Figure 4:
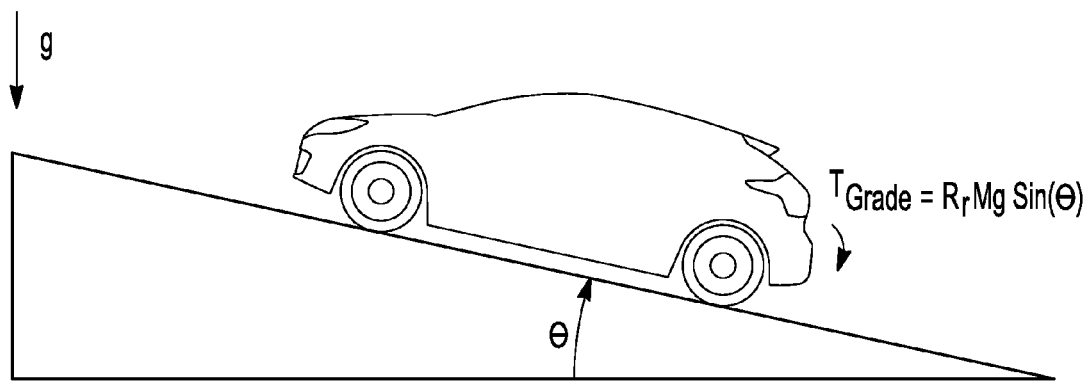
FIG. 4 is a schematic diagram showing the relationship between grade torque and grade angle.

To avoid excessive rotation and oscillation of the damper 58 during regenerative operation, the controller 50, for example, can evaluate several parameters (and control the ISG 18 as described in detail below):

Estimate the steady state damper deflection, $\theta_{damper\_ss}$, according to Eqs. 1 and 2. Regenerative torque is available from the ISG 18. And with reference to FIG. 4, grade torque is equal to $$T_{grade} = R_r Mg \sin(\theta) \qquad \text{Eq. 3}$$

where $R_r$ is tire/wheel rolling radius, M is mass of the vehicle 10, g is gravity, and $\theta$ is the grade angle. Filter the output speed of the torque converter 22, $\omega_{turbine}$, with a band pass filter having a center frequency equal to the shuffle mode frequency, $\omega_{shuffle}$, which is equal to $$\omega_{shuffle} = \sqrt{\frac{K_{axle}}{(I_{rotor} + I_{Trans})N_{Tr}N_{FD}}} \qquad \text{Eq. 4}$$

The amplitude associated with the output of this filter will be denoted as $A_{shuffle}$. Calculate the relative rotational speed across the damper, $\omega_{relative}$, according to $$\omega_{relative} = \omega_{rotor} - \omega_{turbine} \qquad \text{Eq. 5}$$

where $\omega_{rotor}$ is the measured rotor speed of the ISG 18. Filter this signal with a band pass filter having a center frequency equal to the damper natural frequency, $\omega_{damper}$, which is equal to $$\omega_{damper} = \sqrt{\frac{K_{damper}}{I_{rotor}}} \qquad \text{Eq. 6}$$

The amplitude associated with the output of this filter will be denoted by $A_{osc}$.

Given the above data, the controller 50 can command the ISG 18 to operate according to the following conditions:

If $(\theta_{damper\_ss} + A_{osc}) < (\theta_{damper\_ss} + A_{osc\_min})$, where $A_{osc\_min}$ is a calibrated minimum value, do nothing, continue to operate in regenerative mode at current level.

If $(\theta_{damper\_ss} + A_{osc}) > (\theta_{damper\_ss} + A_{osc\_min})$ and $(\theta_{damper\_ss} + A_{osc}) < (\theta_{damper\_ss} + A_{osc\_damp\_max})$, where $A_{osc\_damp\_max}$ is a calibrated maximum value, introduce a feedback of $K_{damping} * \omega_{relative}$ to the ISG calculated torque to reduce, or damp-out, the amplitude of the damper oscillation. (The damping feedback gain, $K_{damping}$, has an initial calibrated minimum value and increases as a function of $A_{osc}$ up to a calibrated maximum value.)

If $(\theta_{damper\_ss} + A_{osc}) > (\theta_{damper\_ss} + A_{osc\_damp\_max})$ and $(\theta_{damper\_ss} + A_{osc}) < (\theta_{damper\_ss} + A_{osc\_regen\_lim})$, where $A_{osc\_regen\_lim}$ is an amplitude of the filtered relative rotational speed across the damper signal associated with a regenerative limit of the system, maintain the feedback of $K_{damping} * \omega_{relative}$ to the ISG calculated torque using the calibrated maximum value for $K_{damping}$, and reduce the regenerative torque by transferring a fraction of the ISG regenerative braking torque to the base friction brakes as a function of $A_{osc}$.

If $(\theta_{damper\_ss} + A_{osc}) > (\theta_{damper\_ss} + A_{osc\_regen\_lim})$, maintain the feedback of $K_{damping} * \omega_{relative}$ to the ISG calculated torque using the calibrated maximum value for $K_{damping}$, restart the engine 14 and close the disconnect clutch 26, exit regenerative mode, transfer the regenerative braking torque to engine braking (i.e., decal fuel shut-off) and base friction braking, reduce a capacity of the bypass clutch 34 to allow slip, and end the damping feedback of $K_{damping} * \omega_{relative}$ to the ISG calculated torque.

If the operator requests braking torque and $A_{shuffle} < A_{shuffle\_max}$, where $A_{shuffle\_max}$ is a calibrated maximum value, return to regenerative mode and monitor for the conditions above.

By monitoring the shuffle mode and damper oscillation amplitudes, calculating the steady state damper deflection, and then adding ISG damping of the damper oscillation as a function of the oscillation amplitude, the damper oscillation amplitude can be managed while in regenerative mode to avoid excessive damper spring deflection that could lead to spring wear and increased NVH.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine;
   a torque converter including a damper; and
   a controller programmed to operate the electric machine to apply a regenerative torque based on a parameter indicative of a deflection of the damper and a parameter indicative of a difference between a rotor speed of the electric machine and an output speed of the torque converter.

2. The vehicle of claim 1, wherein the controller is further programmed to, in response to a sum of the parameters exceeding a first threshold value, reduce the regenerative torque by an amount that is based on an amplitude of an output signal from a filter that takes as input a signal representing the difference between the rotor speed and the output speed, and increase friction brake torque by the amount.

3. The vehicle of claim 2 further comprising an engine and a clutch configured to selectively couple the engine and electric machine, wherein the controller is further programmed to, in response to the sum exceeding a second threshold value greater than the first threshold value, start the engine, engage the clutch, and command the electric machine to discontinue application of the regenerative torque.

4. The vehicle of claim 3, wherein the torque converter further includes a bypass clutch and wherein the controller is further programmed to increase friction brake torque and permit slip of the bypass clutch.

5. The vehicle of claim 3, wherein the controller is further programmed to, in response to a request for braking torque and a value of a parameter indicative of an amplitude of an output signal from a filter that takes as input a signal representing the output speed of the torque converter exceeding a threshold value, operate the electric machine to apply a regenerative torque.

6. The vehicle of claim 1, wherein the parameter indicative of the difference between a rotor speed of the electric machine and an output speed of the torque converter is an amplitude of an output signal from a band pass filter that takes as input a signal representing the difference between the rotor speed and the output speed.

7. The vehicle of claim 6, wherein a center frequency of the band pass filter is equal to a natural frequency of the damper.

8. The vehicle of claim 1, wherein applying a regenerative torque based on a parameter indicative of a deflection of the damper and a parameter indicative of a difference between a rotor speed of the electric machine and an output speed of the torque converter includes introducing feedback to a calculated torque of the electric machine to reduce an amplitude of oscillation of the damper.

9. The vehicle of claim 8, wherein the feedback is proportional to the difference between a rotor speed of the electric machine and an output speed of the torque converter.

10. The vehicle of claim 8, wherein the feedback is equal to a product of a damping gain and the difference between a rotor speed of the electric machine and an output speed of the torque converter.

11. The vehicle of claim 10, wherein the damping gain has minimum and maximum values and varies between the minimum and maximum values as a function of an amplitude of an output signal from a band pass filter that takes as input a signal representing the difference between the rotor speed and the output speed.

12. A method of controlling a vehicle driveline comprising:
   commanding, by a controller, an electric machine to apply a regenerative torque based on a parameter indicative of driveline damper deflection and a parameter indicative of a difference between a speed of the electric machine and an output speed associated with the driveline damper deflection.

13. The method of claim 12 further comprising, in response to a sum of the parameters exceeding a first threshold value, commanding the electric machine to reduce the regenerative torque by an amount that is based on an amplitude of an output signal from a filter that takes as input a signal representing the difference between the speed of the electric machine and the output speed, and commanding friction brakes to increase friction brake torque by the amount.

14. The method of claim 13 further comprising, in response to the sum exceeding a second threshold value greater than the first threshold value, commanding an engine to start, commanding a clutch configured to selectively couple the engine and electric machine to engage, and commanding the electric machine to discontinue application of the regenerative torque.

15. The method of claim 14 further comprising commanding the friction brakes to increase friction brake torque and permitting slip of a bypass clutch.

16. The method of claim 14 further comprising, in response to a request for braking torque and a value of a parameter indicative of an amplitude of an output signal from a filter that takes as input a signal representing the output speed exceeding a threshold value, commanding the electric machine to apply a regenerative torque.

17. A vehicle driveline system comprising:
   an electric machine;
   a damper; and
   a controller programmed to, while operating the electric machine to apply a regenerative torque, introduce feedback to a calculated torque of the electric machine to reduce amplitude of oscillation of the damper, wherein the feedback is proportional to a difference between a speed of the electric machine and an output speed associated with the damper.

18. The system of claim 17, wherein the feedback is equal to a product of a damping gain and the difference between a speed of the electric machine and the output speed associated with the damper.

19. The system of claim 18, wherein the damping gain has minimum and maximum values and varies between the minimum and maximum values as a function of an amplitude of an output signal from a band pass filter that takes as input a signal representing the difference between the speed of the electric machine and the output speed associated with the damper.

20. The system of claim 17 further comprising a torque converter, wherein the damper is disposed within the torque converter.

\* \* \* \* \*